(12) United States Patent
Sulcs et al.

(10) Patent No.: US 6,546,752 B2
(45) Date of Patent: *Apr. 15, 2003

(54) METHOD OF MAKING OPTICAL COUPLING DEVICE

(75) Inventors: Juris Sulcs, Chagrin Falls, OH (US); John M. Davenport, Lyndhurst, OH (US); Roger F. Buelow, II, Cleveland Heights, OH (US)

(73) Assignee: Fiberstars Incorporated, Solon, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/470,156

(22) Filed: Dec. 22, 1999

(65) Prior Publication Data

US 2001/0052247 A1 Dec. 20, 2001

Related U.S. Application Data

(63) Continuation of application No. 09/454,073, filed on Dec. 2, 1999, now Pat. No. 6,304,693.

(51) Int. Cl.⁷ ............................................... C03B 9/325
(52) U.S. Cl. ............................ 65/60.4; 65/64; 65/82; 65/110; 65/105
(58) Field of Search ................... 65/409–501, 60.4, 65/64, 82, 110, 105, 108

(56) References Cited

U.S. PATENT DOCUMENTS

| | | | | |
|---|---|---|---|---|
| 1,888,635 A | * | 11/1932 | Koenig ........................ | 65/110 |
| 2,020,590 A | * | 11/1935 | Swain ......................... | 65/110 |
| 2,087,947 A | * | 7/1937 | Dichter ....................... | 65/110 |
| 2,735,230 A | * | 2/1956 | Morrill ........................ | 65/110 |
| 2,790,994 A | * | 5/1957 | Cardot ........................ | 65/110 |
| 3,802,757 A | * | 4/1974 | Benda | |
| 4,050,601 A | * | 9/1977 | Bogaard ...................... | 65/110 |
| 4,525,192 A | * | 6/1985 | Booms ........................ | 65/110 |
| 4,822,389 A | * | 4/1989 | Berkey ........................ | 65/110 |
| 4,891,555 A | | 1/1990 | Ahlgren et al. | |
| 5,237,170 A | * | 8/1993 | Shatz .......................... | 250/216 |
| 5,675,677 A | * | 10/1997 | Davenport et al. .......... | 315/248 |

FOREIGN PATENT DOCUMENTS

IT        254297    *   7/1927  .................. 65/108

* cited by examiner

Primary Examiner—John Hoffmann
(74) Attorney, Agent, or Firm—Charles E. Bruzga

(57) ABSTRACT

A method of making an optical device comprises the steps of providing a body of vitreous material that is generally tubular along an axis. A portion of the body is molded with external mold structure for forming a bulbous portion when the interior of the tube is pressurized. An axial portion is cut from the bulbous portion to form a first coupling device with first and second axially oriented openings. This method can produce optical coupling devices with excellent optical quality in an economical manner.

23 Claims, 5 Drawing Sheets

CUTTING AXIAL PORTION FROM BULBOUS REGION — 120

FIG. 15

METHOD OF MAKING OPTICAL COUPLING DEVICE

CROSS-REFERENCE TO RELATED APPLICATION

This application is a continuation of, and claims priority from, co-pending application Ser. No. 09/454,073, filed Dec. 2, 1999, now U.S. Pat. No. 6,304,693 entitled "Efficient Arrangement for Coupling Light from a Light Source to a Light Guide," by Roger F. Buelow II, John M. Davenport, and Juris Sulcs, assigned to the same assignee as the present application.

FIELD OF THE INVENTION

The present invention relates to a method of making optical coupling devices.

BACKGROUND OF THE INVENTION

The present invention relates to a method of making optical coupling devices used in light coupling arrangements for arc sources with relatively long arc gaps (e.g., 7 mm) that are not as "point-like" as shorter gaps (e.g., 2.7 mm). These devices, described in detail in the above-cross-referenced application, employ non-focusing optical devices to achieve a reduction in the angular distribution of light transmitted from a light source to the extent desirable for efficient collection and transmission by a light guide or fiber arrangements. This enables the light to be coupled at high efficiency between the light source and one or more light guides or optical fibers. While conventional optical reflecting elements (e.g. elliptical reflectors) made from vitreous materials can be typically formed by pressing molten gobs of vitreous material, the nearness of the hot arc source to the reflecting surface of these elements necessitate the use of highly refractive vitreous materials for their manufacture—e.g., quartz. These materials, however, are difficult and expensive to form by pressing.

It would be desirable if the optical devices of the light coupling arrangements described in the above cross-referenced application could be manufactured more easily and at lower costs than elliptical (or other focusing) collectors.

SUMMARY OF THE INVENTION

In accordance with an exemplary embodiment of the invention, a method of making an optical device comprises the steps of providing a body of vitreous material that is generally tubular along an axis. A portion of the body is molded with external mold structure for forming a bulbous region when the interior of the tube is pressurized. An axial portion is cut from the bulbous region to form a first coupling device with first and second axially oriented openings.

The foregoing method can produce optical coupling devices with excellent optical quality in an economical manner that can be used, for instance, in the light coupling arrangements of the above cross-referenced application.

DESCRIPTION OF THE DRAWINGS

FIG. 15 is a block diagram of a step of cutting axial portions from a bulbous region.

DETAILED DESCRIPTION OF THE INVENTION

Figure 1:
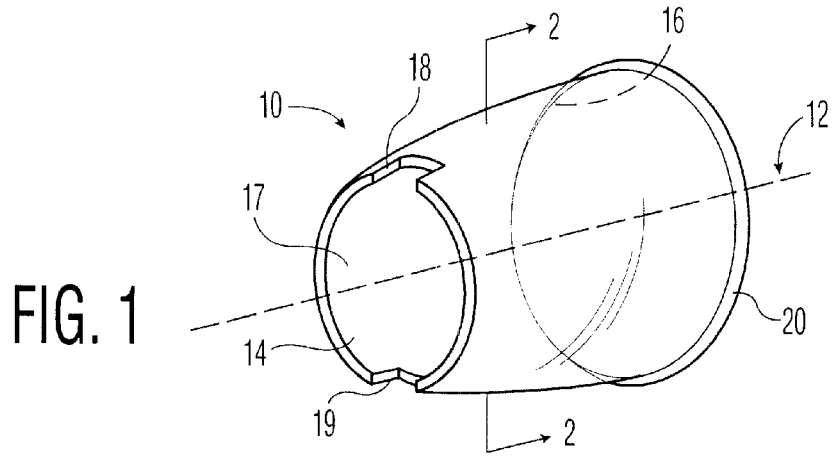
FIG. 1 is a perspective view of a coupling device made by the method of the present invention.

FIG. 1 shows a coupling device 10 made by the method of the present invention. Device 10 of vitreous material is generally tubular along an axis 12 of light propagation, and has first and second axially oriented openings 14 and 16. By "vitreous" is meant material that becomes smooth when heated, such as quartz or high temperature borosilicate glass. Interior surface 17 of the device reflects light. Opening 14 may have a recess 18 and may also have a recess 19, each extending toward opening 16. A ridge 20 may be present at opening 16 for purposes described below. As will be apparent from the above cross-referenced application, recesses 18 and 19 may receive respective portions of lamps of either the electroded or electrodeless type for positioning and aligning the lamps.

Figure 2:
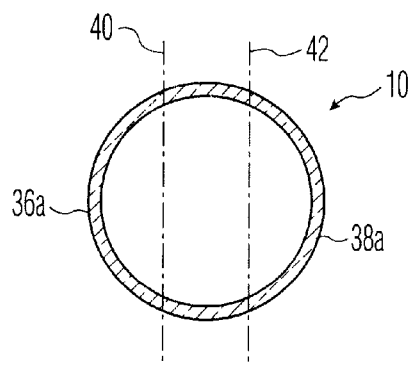
FIG. 2 shows a cross sectional slice of the coupling device of FIG. 1 along an axis of light propagation, taken at arrows 2—2 in FIG. 1.

FIG. 2 shows a cross sectional slice of coupling device 10 of FIG. 1 taken along axis 12 in FIG. 1. The slice is substantially circular.

Figure 3:
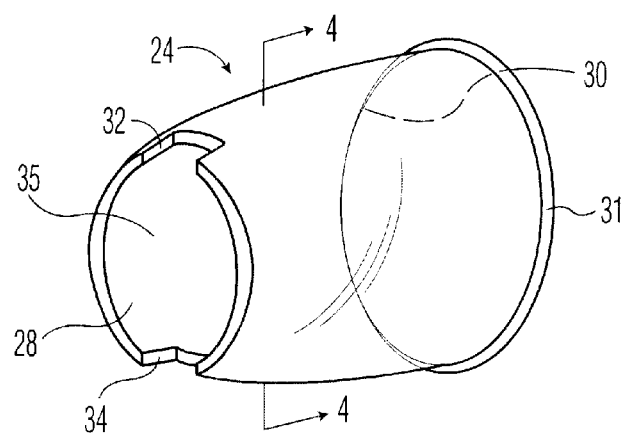
FIG. 3 is similar to FIG. 1, showing another coupling device made by the method of the present invention.

FIG. 3 shows a further coupling device 24 made from the method of the present invention. Similar to device 10 of FIG. 1, device 24 has openings 28 and 30 along an axis (not shown) of light propagation, may have a ridge 31, may have a recess 32 and may also have a recess 34. Interior surface 35 of the device reflects light.

Figure 4:
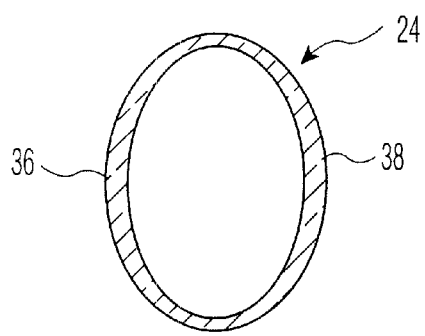
FIG. 4 shows a cross sectional slice of the coupling device of FIG. 3 along an axis of light propagation, taken at arrows 4—4 in FIG. 3.

FIG. 4 shows a cross sectional slice of device 24, which preferably comprises a left side 36 and a right side 38 and together the sides form a shape as shown. Each side defines an arc of substantially the same radius and degrees. The increased efficiency of such shape is described in the above cross-referenced application. Conceptually, sides 36 and 38 resemble respective portions 36a and 38a of device 10 of FIG. 2, which would result from removing the central portion of the device between vertical lines 40 and 42. shape is described in the above cross-referenced application.

Conceptually, sides 36 and 38 resemble respective portions 36a and 38a of device 10 of FIG. 2, which would result from removing the central portion 6f the device between vertical lines 40 and 42.

In addition to the coupling devices of FIGS. 1–4, many other shapes of coupling devices can be made by the method of the present invention as will be apparent to those of ordinary skill in the art.

Figure 5:
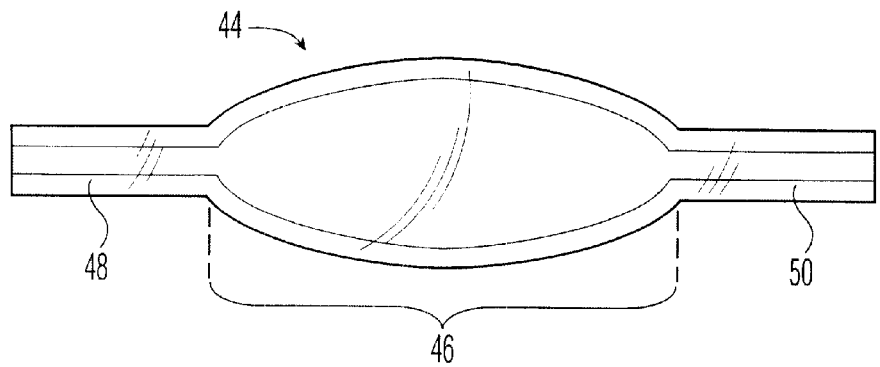
FIG. 5 is a side plan view of a partially fabricated arc tube according to the prior art.
Figure 6:
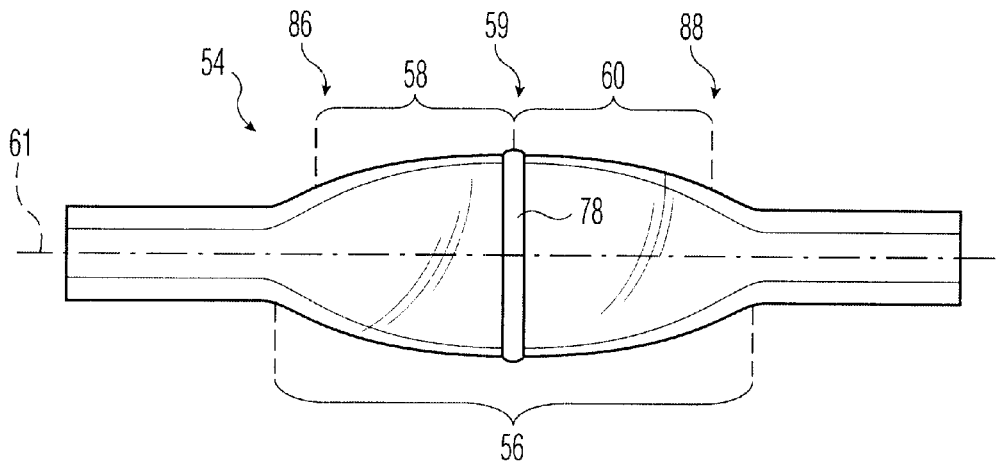
FIG. 6 is a side plan view of a body of vitreous material produced by a molding step of the present invention.

Some of the steps of the inventive method are similar to prior art steps for manufacturing arc tubes. Therefore, reference can generally be made to prior art techniques for making quartz arc tubes such as an arc tube 44 of FIG. 5, which includes a bulbous portion 46 between two tubular end portions 48 and 50. U.S. Pat. No. 4,891,555, for instance, may be considered. Electrode structure normally inserted in the end portions is not shown. In contrast, FIG. 6 shows a body 54 having some resemblance to arc tube 44 of FIG. 5. Body 54 includes a bulbous region 56 that may, by way of example, be elliptical or tubular, or have a cross section taken along a central axis 61 that is polygonal, circular or oblong. Bulbous region 56 may have a maximum diameter at its midpoint 59 along axis 61 and tapers in diameter towards its left and right axial ends. From bulbous region 56, axial sections 58 and 60 are cut and their inner surfaces made reflective in forming a pair of coupling devices.

When forming body 54, manufacturing tolerances should be kept especially low to substantially achieve an optically desired shape for its inner surface at axial sections 58 and 60, which are used in forming coupling devices. However, the wall thickness of such sections can decrease substantially from the end portions to the mid-portion near axial point 59, i.e., by more than about 50 percent. Such variance can be seen in FIG. 6, with axial section 60 being thicker at the right and thinner towards the left. This contrasts with arc tube 44 (FIG. 5) that has a substantially uniform wall thickness, as shown, to enable it to remain intact under high pressures typically reaching 5 to 50 atmospheres or more. Tolerances can be kept low, for instance, by maintaining an accurate shape of a mold (discussed below), accurately centering a tube of, e.g., quartz, and accurately positioning the mold on the tube. These measures will be routine to those of ordinary skill in the art from the present specification.

Figure 7:
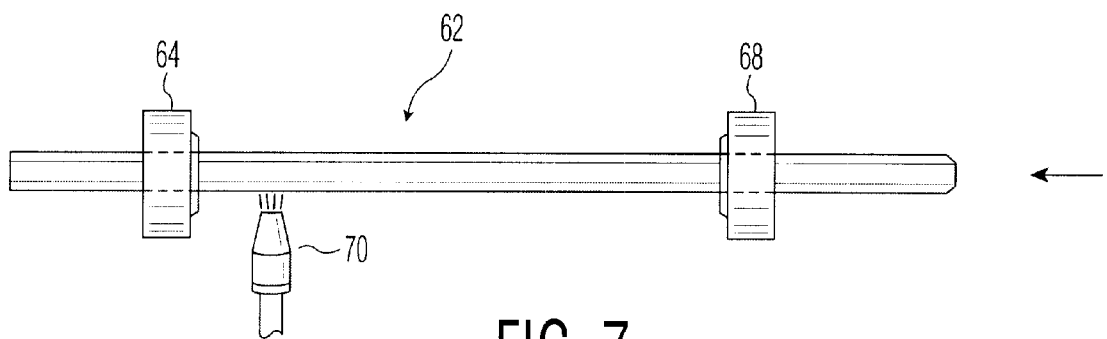
FIG. 7 is a side plan view of a tube of vitreous material held in a lathe and showing a straightening and stress-relieving step.

FIG. 7 shows a tube 62 of quartz or other vitreous material held in an axially stationary holding device, or headstock 64 and an axially moveable holding device, or tailstock 68. Tube 62 is heated in a pair of respective narrow zones between, and near, stocks 64 and 68 by, for instance, a torch 70 near but not touching the tube. This procedure compensates for any longitudinal curvature in the tube. It also relieves stress when tailstock 68 grips the tube so as to avoid twisting of the body during subsequent steps.

Figure 8:
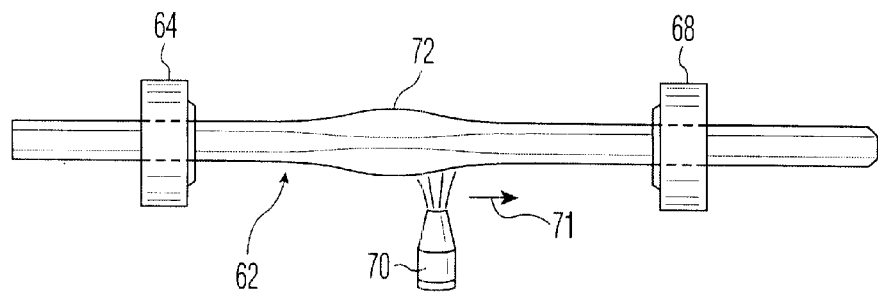
FIG. 8 is similar to FIG. 7, showing a step of gathering material of the tube to form a bulbous region.

FIG. 8 shows a step of gathering material of tube 62 into a bulbous region 72 of sufficient thickness to provide adequate material for a subsequent molding step. Gathering is accomplished by moving tailstock 68 towards headstock 64 while heating tube 62 with, for instance, torch 70, which softens the heated material into a malleable state in which it can be molded. Arrow 71 shows a typical direction of movement of the torch.

Since the capital cost of a lathe is quite substantial and the gathering step of FIG. 8 takes significant time, it would be desirable to minimize or even eliminate the step. Towards this end, a typically large-diameter tube is used as shown in FIG. 6 to the right and left of bulbous region 56, with a 9-mm inner diameter and a 11-mm outer diameter, for instance. The inner diameter of the tube is preferably chosen to be approximately the same or smaller than the smallest inner diameter of a completed device; e.g., at the right side of axial section 60. This reduces the time required for gathering. Arc tube 44 of FIG. 5, in contrast, may have, e.g., a 5-mm inner diameter and a 7-mm outer diameter to achieve a bulbous region 46 comparable in size to bulbous region 56 in FIG. 6.

Figure 9:
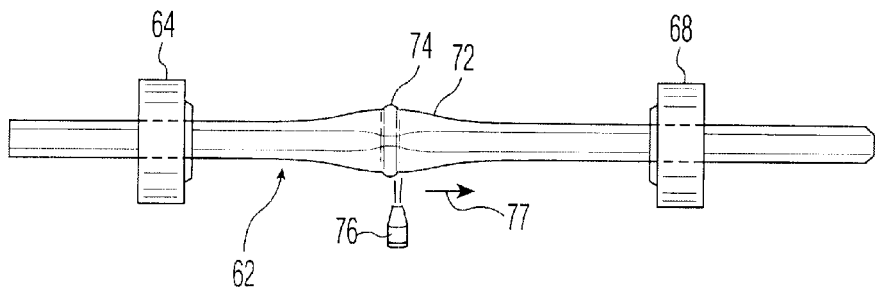
FIG. 9 is similar to FIG. 7, showing another gathering step for forming an outwardly facing ridge on a bulbous region.

FIG. 9 shows a preferred step of gathering material at the axial midpoint of bulbous region 72 into a narrow, outwardly facing ridge 74. This is accomplished in the same general manner as the gathering step of FIG. 8 (e.g., moving tailstock 68 towards headstock 64), but instead uses a torch, or heat zone, 76 that is more narrow than torch 70 of FIG. 8. Arrow 77 shows a typical direction of movement of the torch. Ridge 74 provides sufficient material to form outwardly facing ridge 78 of body 54 (FIG. 6). Referring to FIG. 6, ridge 78 provides a visual alignment guide for cutting transverse to axis 61 at midpoint 59, while strengthening the body to make it resistant to fracturing when being cut with a diamond wheel, for instance. A visual alignment guide could be alternatively formed by providing dimples or other shapes on the exterior of body 54.

Figure 10:
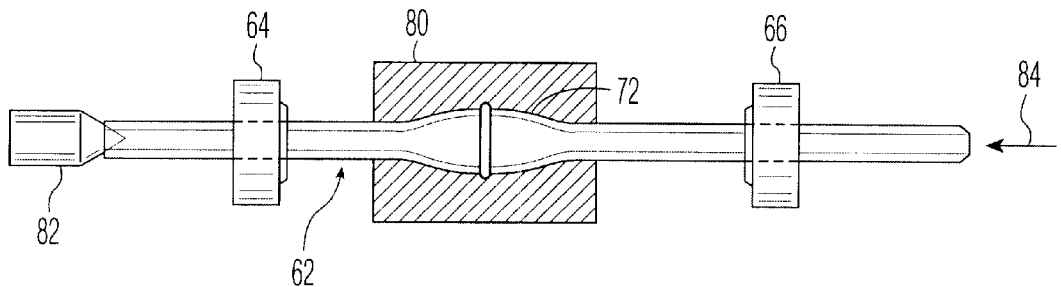
FIG. 10 is similar to FIG. 7, showing a step of molding the outer surface of a bulbous region.

FIG. 10 shows a molding step in which bulbous region 72 is encased in molding structure 80 while the lathe (not shown) is stationary. Prior to encasing tube 62 in structure 80, the tube is heated by a torch (not shown). In FIG. 10, with left end of tube 62 sealed with a plug 82, argon or other gas is pumped into the right side of the tube as indicated by arrow 84. The increased pressure in the tube forces the exterior surface of bulbous region 72 to conform to the inner shape of the mold structure. This allows precise control of the outer surface of the bulbous region and secondarily of its wall thickness, which would be important for making an arc tube. For making an optical coupling device with an inner light-reflecting surface, the bulbous region is preferably varied in thickness so that the flow characteristics of the deformable material result in a reasonably accurate final shape of the inner surface. This is particularly so when making a device having a non-circular (e.g., oblong) cross section perpendicular to the axis of light propagation, as in FIGS. 3–4. This consideration will be routine to those of ordinary skill in the art from the present specification.

After the molding step of FIG. 10, the molded tube is annealed by placing the tube in an oven or by applying heat from a torch, for instance.

The foregoing steps can produce body 54 of FIG. 6. Axial sections 58 and 60 can then be cut from body 54 with a cutting device, such as a diamond wheel, preferably wet, or a laser. Alternatively, by way of example, the technique of score-snapping can be used by circumferentially scoring, or scratching, body 54 at one of axial points 59, 86 and 88, and then bending the ends of the body about such point. FIG. 15 shows the foregoing cutting at step 120.

Figure 11:
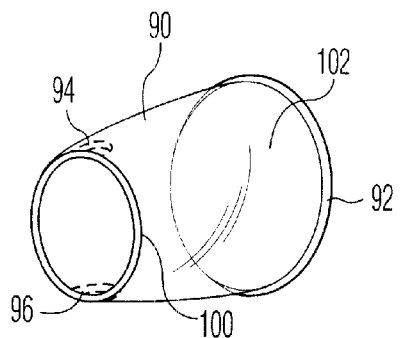
FIG. 11 is a perspective view of a partially formed coupling device.

FIG. 11 shows a structure 90 resulting from cutting axial section 58 or 60 in FIG. 6. Using body 54 of FIG. 6 results in structure 90 having a thinner wall at its right-hand axial end than at its left-hand end. A portion 92 of ridge 78 (FIG. 5) is positioned approximately at the right-hand axial end of structure 90, and strengthens that end.

Cuts may be made in structure 90 of FIG. 11 to form recesses 94 and 94 shown by phantom lines, similar to recesses 18 and 20 (FIG. 1) or 32 and 34 (FIG. 3). Cutting may be made by a diamond wheel (not shown), preferably wet, used in the manner of a radial arm saw; that is, with the wheel in the plane of the central longitudinal axis of the structure (as axis 61 in FIG. 6). The diamond wheel is preferably shaped to conform to the desired shape of a recess. For a round recess, the tip of the wheel is preferably rounded in cross section taken transverse to its axis.

Rather than forming a single bulbous region from a tube of vitreous material as described above, a plurality of bulbous regions could be formed in the same tube. A single mold structure (e.g., 80 in FIG. 10) modified to have a plurality of bulbous regions could then sequentially mold each bulbous portion to achieve the desired shape for each region.

Figure 12:
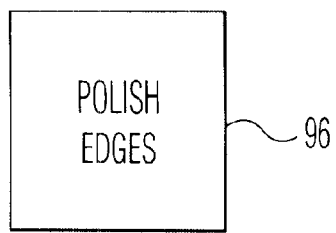
FIG. 12 is a block diagram of a step of polishing edges that have been cut.

After the cutting of axial sections of body 54 (FIG. 6) and cutting of any recesses as just described, silica smoke and any other impurities are preferably removed in conventional manner. This is preferably followed by a polishing step in which the cut edges, such as edges 100 and 102 in FIG. 12, of the structure are heated and allowed to form a smooth surface resistant to cracking. FIG. 12 indicates such a polishing step 96. Preferably the heat is supplied by a torch (not shown).

After the polishing step of FIG. 12, the molded tube is preferably annealed again by placing the tube in an oven or by applying heat from a torch, for instance.

Figure 13:
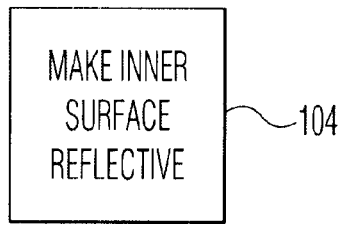
FIG. 13 is a block diagram of a step of making the inner surface of a device reflective.

FIG. 13 shows a block 104 for a subsequent step of making the interior surface of structure 90 (FIG. 12) reflective to light. This can be done, for instance, by applying a multi-layer optical interference coating, or by applying a metallic reflective coating, both known processes.

Figure 14:
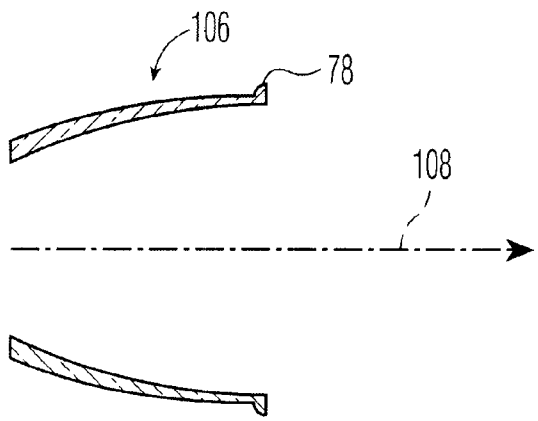
FIG. 14 shows a cross-sectional slice of a coupling device having a preferred shape.

FIG. 14 shows a cross section of a coupling device 106 taken along the central axis of light propagation 108. It is preferred that the interior of substantially all cross-sectional segments along the interior of coupling device 106 taken through the central axis of light propagation be substantially parabolic, or concave, or substantially conform to a CPC shape. CPC is a specific form of an angle-to-area converter, as described in detail in, for instance, W. T. Welford and R. Winston, High Collection Nonimaging Optics, New York: Academic Press, Inc. (1989), chapter 4 (pp. 53–76).

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A method of making an optical coupling device, comprising the steps of:
    a) providing a body of vitreous material that is generally tubular along an axis;
    b) molding a portion of the body by placing external mold structure around an axial portion of the body, sealing one axial end of the portion with a plug, and pumping gas into another axial end of the portion so as to force the exterior surface of the portion to conform to an inner shape of the mold structure, for forming a bulbous portion; and
    c) cutting an axial portion from the bulbous portion to form a first optical coupling device with first and second axially oriented edges respectively defining first and second openings that are continuously hollow from the first opening to the second opening;
    d) after providing a body of vitreous material and prior to the step of molding a portion of the body, gathering material along an axial portion of the body, which axial portion is substantially shorter than the bulbous portion, for forming at least one ridge extending outwardly; and
    e) the step of molding a portion of the body includes forming the-at least one ridge.

2. The method of claim 1, further comprising the step of applying a reflective, multi-layer optical interference coating to the interior of the first optical coupling device.

3. The method of claim 1, wherein the step of cutting includes forming a first optical coupling device with its first and second edges of substantially different lengths.

4. The method of claim 1, further comprising, after providing a body of vitreous material and prior to the step of molding a portion of the body, the step of gathering material of the body used for forming the bulbous portion.

5. The method of claim 1, wherein the step of cutting an axial portion from the bulbous portion includes the step of selecting such axial portion so that at least a portion of the ridge is positioned approximately at an axial end of the device, for strengthening the device produced by the present method.

6. The method of claim 1, further comprising the step of cutting a second axial portion from the bulbous portion to form a second optical coupling device with first and second axially oriented edges respectively defining first and second openings that are continuously hollow from the first opening to the second opening.

7. The method of claim 1, wherein the step of molding a portion of the body includes shaping the bulbous portion to have a cross section, perpendicular to the axis which cross section is oblong.

8. The method of claim 1, wherein the step of molding a portion of the body includes shaping the outer surface of the body to result in the interior of substantially all cross-sectional segments along the interior of an optical coupling device taken through a central axis of light propagation forming a compound parabolic concentrator wherein the segments each extend for at least the majority of the length of the optical coupling device along the axis.

9. The method of claim 1, wherein the step of molding a portion of the body includes shaping the outer surface of the body to result in the interior of substantially all cross-sectional segments along the interior of an optical coupling device taken through a central axis of light propagation being substantially concave wherein the segments each extend for at least the majority of the length of the optical coupling device along the axis.

10. The method of claim 1, wherein the step of molding a portion of the body includes the step of forming a bulbous portion having a cross section transverse to the axis comprising essentially two circular arcs of substantially the same radius, each arc being substantially less than 180 degrees, joined together to form an oblong shape.

11. The method of claim 1, wherein the step of providing a body of vitreous material comprises providing a body of quartz material.

12. A method of making an optical coupling device, comprising the steps of:
    a) providing a body of vitreous material that is generally tubular along an axis;
    b) molding a portion of the body by placing external mold structure around an axial portion of the body, sealing one axial end of the portion with a plug, and pumping gas into another axial end of the portion so as to force the exterior surface of the portion to conform to an inner shape of the mold structure, for forming a bulbous portion;
    c) cutting an axial portion from the bulbous portion to form a first optical coupling device with first and second axially oriented, substantially planar edges respectively defining first and second openings that are continuously hollow from the first opening to the second opening; and d) recessing the first edge in the direction of the second edge to form a recessed edge region for receiving a respective portion of a lamp such that the lamp can be positioned closer to the second edge than in the absence of such recessing.

13. A method of making an optical device, comprising the steps of:

a) providing a body of vitreous material that is generally tubular along an axis;

b) molding a portion of the body with external mold structure for forming a bulbous portion with a substantially enlarged mid-portion relative to axial end portions when the interior of the tube is pressurized; and c) thereafter cutting an axial portion from the bulbous portion to form a first optical coupling device with first and second axially oriented edges respectively defining first and second openings that is are continuously hollow from the first opening to the second opening; such cutting including cutting at a position proximate the axial center of the mid-portion and at a position closer to an axial end portion;

d) after providing a body of vitreous material and prior to the step of molding a portion of the body, gathering material along an axial portion of the body, which axial portion is substantially shorter than the bulbous portion, for forming at least one ridge extending outwardly; and e) the step of molding a portion of the body includes forming the at least one ridge.

14. The method of claim 13, further comprising the step of applying a reflective, multi-layer optical interference coating to the interior of the first optical coupling device.

15. The method of claim 13, further comprising, after providing a body of vitreous material and prior to the step of molding a portion of the body, the step of gathering material of the body used for forming the bulbous portion.

16. The method of claim 13, wherein the step of cutting an axial portion from the bulbous portion includes the step of selecting such axial portion so that at least a portion of the ridge is positioned approximately at an axial end of the device, for strengthening the device produced by the present method.

17. The method of claim 16, wherein the step of molding a portion of the body includes the step of forming a bulbous portion having a cross section transverse to the axis comprising essentially two circular arcs of substantially the same radius, each arc being substantially less than, 180 degrees, joined together to form an oblong shape.

18. The method of claim 13, wherein the step of providing a body of vitreous material comprises providing a body of quartz material.

19. The method of claim 13, wherein the step of molding the body includes molding apportion of the body so that a portion forming the first optical coupling device has an inner surface with predetermined shape and a wall thickness substantially decreasing in size from the first opening to the second opening.

20. The method of claim 13, wherein:

a) the step of cutting an axial portion from the bulbous portion includes cutting so that the first and second axially oriented openings are of substantially different sizes;

b) the step of molding a portion of the body includes forming the first optical coupling device having an inner surface with predetermined shape and a wall thickness substantially decreasing in size from the first opening to the second opening; and c) other than the step of gathering material for forming the at least one ridge, the method is free of a further step of gathering material of the body.

21. A method of making an optical device, comprising the steps of:

a) providing a body of vitreous material that is generally tubular along an axis;

b) molding a portion of the body with external mold structure for forming a bulbous portion with a substantially enlarged mid-portion relative to axial end portions when the interior of the tube is pressurized;

c) thereafter cutting an axial portion from the bulbous portion to form a first optical coupling device with first and second axially oriented edges respectively defining first and second openings that are continuously hollow from the first opening to the second opening; such cutting including cutting at a position proximate the axial center of the mid-portion and at a position closer to an axial end portion; and d) forming at least one recess in a first opening of the optical coupling device body extending toward the second opening and being for receiving a respective portion of a lamp.

22. The method of claim 21, wherein the step of molding a portion of the body includes shaping the bulbous portion to have a cross section, perpendicular to the axis which cross section is oblong.

23. The method of claim 21, wherein:

a) the method further comprises, after providing a body of vitreous material and prior to the step of molding a portion of the body, the step of gathering material along an axial portion of the body, which axial portion is substantially shorter than a majority of the axial length of the bulbous portion, for forming at least one ridge extending outwardly; and b) the step of molding a portion of the body includes forming the at least one outwardly extending ridge.

* * * * *